US009154528B2

(12) United States Patent
Liu et al.

(10) Patent No.: US 9,154,528 B2
(45) Date of Patent: Oct. 6, 2015

(54) DISTRIBUTED MEDIA GATEWAYS

(71) Applicant: Futurewei Technologies, Inc., Plano, TX (US)

(72) Inventors: Deming Liu, San Jose, CA (US); Xiaoyong Yi, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 142 days.

(21) Appl. No.: 14/047,087

(22) Filed: Oct. 7, 2013

(65) Prior Publication Data

US 2015/0097921 A1    Apr. 9, 2015

(51) Int. Cl.
*H04N 7/14* (2006.01)
*H04L 29/06* (2006.01)
*H04N 7/15* (2006.01)

(52) U.S. Cl.
CPC ........ *H04L 65/1023* (2013.01); *H04L 65/1073* (2013.01); *H04N 7/15* (2013.01)

(58) Field of Classification Search
CPC .... H04I 65/1023; H04L 65/1073; H04N 7/15
USPC .......................... 348/14.08; 370/260; 709/204
See application file for complete search history.

(56) References Cited

U.S. PATENT DOCUMENTS

| 2004/0010582 | A1* | 1/2004 | Oliver .......................... 709/224 |
| 2008/0317238 | A1* | 12/2008 | Cai et al. .................. 379/220.01 |
| 2010/0115135 | A1* | 5/2010 | Zhou et al. .................... 709/247 |
| 2010/0226363 | A1* | 9/2010 | McGuigan et al. ........... 370/352 |
| 2010/0238564 | A1* | 9/2010 | Kubota et al. ................ 359/687 |
| 2013/0232558 | A1* | 9/2013 | Brown et al. ..................... 726/4 |
| 2015/0097921 | A1* | 4/2015 | Liu et al. .................... 348/14.08 |

OTHER PUBLICATIONS

"Tandberg Codian MCU 4501," downloaded from http://www.ivci.com/videoconferencing-codian-mcu-4501.html on Oct. 7, 2013, 2 pgs.

* cited by examiner

*Primary Examiner* — Creighton Smith
(74) *Attorney, Agent, or Firm* — Conley Rose, P.C.; Grant Rodolph; Richard J. Mason

(57) ABSTRACT

A method performed in a call manager, the method comprising receiving a registration message from a media gateway in a plurality of media gateways, wherein the registration message indicates the media processing resources available at the media gateway and the amount of media processing resources in use, sending a message to each of the other media gateways in the plurality of media gateways, wherein each of the messages indicates an amount of available media processing resources in the media gateway, and sending at least one message to the media gateway, wherein the at least one message indicates an amount of available media processing resources in each of the other media gateways in the plurality of media gateways.

23 Claims, 4 Drawing Sheets

DISTRIBUTED MEDIA GATEWAYS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Video conferencing may require a substantial amount of data to be streamed or otherwise communicated across communications networks. Media gateways may be employed in such networks to transcode media streams between different telecommunication systems. A conventional system may utilize centralized media gateway architecture in which traffic across a network may be concentrated through one gateway. For example, a multi-point control unit (MCU) may be used to bridge video conferencing connections, wherein conference streams may be distributed to multiple endpoints over an internet protocol (IP) network. An MCU may also apply media processing techniques, such as digital signal processing, to perform compression/decompression and encoding/decoding of video or audio streams.

However, the centralized approach of existing gateways may be limited in that a video conference may only use media processing resources local to an MCU. Media processing resources may not be shared across networks with a central gateway, and there may be no local resources available for remote endpoints. In order to send traffic from an endpoint in a conference, an MCU may also be required to directly send a copy of the data to all of the other endpoints over an IP network. Furthermore, this may increase traffic in a bandwidth limited environment such as a wide area network (WAN), wherein multiple computer networking architectures transmit data over broad ranges of distances. Therefore, there is a need to enhance video conferencing architecture in order to accommodate a greater number of users in a bandwidth restricted network while maintaining quality of service.

SUMMARY

In one embodiment, the disclosure includes a method performed in a call manager, the method comprising receiving a registration message from a media gateway in a plurality of media gateways, wherein the registration message indicates the media processing resources available at the media gateway and the amount of media processing resources in use, sending a message to each of the other media gateways in the plurality of media gateways, wherein each of the messages indicates an amount of available media processing resources in the media gateway, and sending at least one message to the media gateway, wherein the at least one message indicates an amount of available media processing resources in each of the other media gateways in the plurality of media gateways.

In another embodiment, the disclosure includes a method performed in a call manager, the method comprising sending a message to a plurality of media gateways, wherein the message comprises a request to transmit a ping message from the corresponding media gateway to an endpoint, receiving a second message from each of the plurality of media gateways, wherein each of the second messages comprises a distance between the corresponding media gateway and the endpoint, and wherein the distance between two nodes is measured as the number of hops between the two nodes, and sorting the plurality of gateways according to the distance between the corresponding media gateway and the endpoint to generate a list of media gateways for the endpoint.

In yet another embodiment, the disclosure includes a media gateway comprising a transceiver configured to receive at least one message from a call manager, wherein the at least one message requests that the media gateway establish a communications link with a second media gateway, wherein the second media gateway is responsible for an endpoint, wherein the request indicates a codec characteristic for use on the communications link, and establish the communications link, and a media processor comprising the codec characteristic, coupled to the transceiver, and configured to communicate over the communications link using the transceiver.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, apparatuses, methods, and computer program products related to distributed media gateway architectures. Distributed media gateway architectures improve upon conventional centralized gateway architectures to support efficient communication (e.g., video conferencing) over bandwidth restricted networks. In a distributed architecture there may be a plurality of media gateways, each of which may be responsible for different communication endpoints. In such an architecture, traffic from endpoints may be aggregated in a local media gateway and multicast to other media gateways for relay to associated endpoints, instead of multicasting directly to all other endpoints. In this manner, traffic in the interconnection network may be reduced and media processing resources (e.g., digital signal processing resources devoted to transcoding) may be distributed over multiple gateways so that a greater number of endpoints may be serviced than in an architecture with a centralized media gateway.

Figure 1:
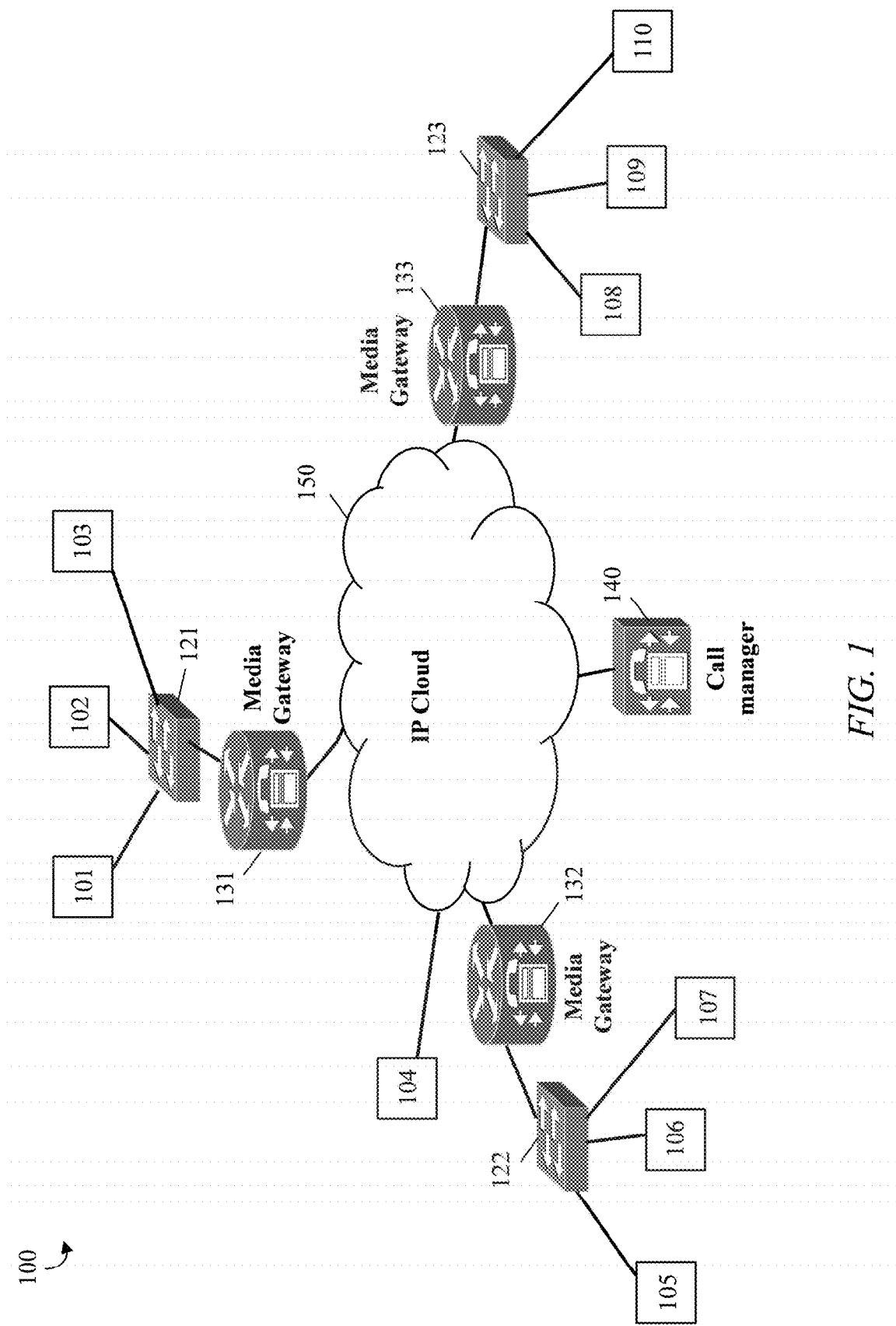
FIG. 1 is an embodiment of a distributed media gateway architecture.

FIG. 1 is an embodiment of a distributed media gateway architecture 100. The architecture 100 may comprise a plurality of endpoints 101-110, a plurality of switches 121-123, a plurality of media gateways 131-133, and a call manager 140 interconnected via an IP cloud 150. Although only ten endpoints 101-110, three switches 121-123, and three media gateways 131-133 are shown for illustrative purposes, any number of each component may be used in distributed architecture. For example, distributed architecture may extend across regional or national boundaries. The distributed media gateway architecture 100 may, for example, be used to support video conferencing.

The endpoints 101-110 may be video conferencing systems wherein users may initiate or receive an audio and/or video stream in a conference call. Multiple endpoints 101-110 may be connected to one of the switches 121-123, as illustrated by the connection of endpoints 105-107 to switch 122. Switches 121-123 may be used in packet switching to transmit traffic between one of the media gateways 131-133 to different endpoints 101-110. Thus, each of the switches 121-123 may be coupled to one of the media gateways 131-133. For example, switch 121 may be connected to media gateway 131, and so forth.

Media gateways 131-133 may conduct transcoding and media processing of the audio and video streams in a conference, wherein the connected endpoint devices (101-110) may employ different formats and coding. Each of the media gateways 131-133 may be employed in terms of distance and availability to specific endpoints 101-110. That is, the media gateway 131-133 that is of closest distance to an endpoint 101-110 may be selected for use if the gateway is available. Distance between two nodes may be measured as the number of hops between the two nodes. If the closest resource is unavailable, then the endpoint 101-110 may use a remote resource in the network. For example, endpoint 105 may employ gateway 132, while endpoint 108 may employ gateway 133 if these resources are available. However, if gateway 132 is unavailable, then endpoints 105 and 108 may both select gateway 133 for use. A media gateway 131-133 may not necessarily have to be connected locally to each endpoint 101-110 in a network. For example, as shown in FIG. 1, endpoint 104 is not connected locally to a gateway. In this case, one of the media gateways 131-133 may be selected for endpoint 104. Thus, distributed resources in a network may be shared in order to accommodate all the parties that desire to participate in a conference.

In an embodiment, the endpoints 101-110 and switches 121-123 associated with each of the media gateways 131-133 may be referred to as a branch of a network. For example, there may be three branches shown in FIG. 1 for illustrative purposes; however, any number of branches may be used in an architecture. Multiple media gateways may be further grouped (e.g., in groups of ten) in different branch offices to share media processing resources. Each of the branch offices may have a specific number of endpoints joining the same conference. A small office may not have its own media gateway, wherein endpoints at an office may need to utilize an available gateway.

A call manager, such as call manager 140, may be employed in order to select an appropriate media gateway 131-133 for an endpoint 101-110. The call manager 140 may comprise information, e.g., regarding media processing resources and endpoint distances, in order to match a media gateway 131-133 to an endpoint 101-110 using the information. When an endpoint is initially registered, the call manager 140 may create a sorted gateway list for the endpoint based on distances between the endpoint and gateway resources. When a call comes in, the call manager 140 may then allocate the nearest available resource to the endpoint, in order to conduct transcoding and media processing of the incoming and outgoing streams.

The functionality of a distributed media gateway architecture, such as the architecture 100, may not depend on the presence of network wide features such as multimedia networks. A multimedia network may comprise sending and receiving audio and video streams for specific applications and may optimize traffic among gateways 131-133 in order to reduce traffic from the perspective of the endpoints 101-110. If an IP network has enabled multimedia support, this feature may help distributed gateways further improve performance. For example, multimedia networks may provide significant bandwidth and metrics for finding local gateways efficiently. They may also reserve bandwidth and provide information about available bandwidths in order to effectively support multicast and reduce traffic further among gateways 131-133. However, multimedia support may not be essential, and the underlying issues with centralized media gateways may still exist with or without multimedia networks.

Suppose that a network uses a single media gateway, instead of multiple media gateways as show in FIG. 1. Such a network may be referred to as a conventional network or system. A data stream from an endpoint may be received by the media gateway and then multicast to all the remaining endpoints. If there are N endpoints, where N is an integer greater than one, a data stream or traffic from a first endpoint would be multicast to the remaining N−1 endpoints, resulting in N−1 streams in the network.

In contrast, in a distributed media gateway architecture traffic from one or more endpoints may be communicated to a first gateway, and the traffic from the first gateway may be forwarded to other gateways before being distributed by those gateways to other endpoints. A "local gateway" for an endpoint is the gateway assigned to that endpoint through which communication with other endpoints remote to the endpoint takes place. For example, referring to FIG. 1, media gateway 131 is a local gateway for endpoints 101-103, whereas media gateway 133 is a "remote gateway". In a distributed media gateway architecture, a data stream from an endpoint may not be directly multicast to remote endpoints by a local gateway. For example, referring to FIG. 1, traffic from local endpoints 101-103 may first be aggregated at a local gateway 131 and then sent to a remote gateway, such as gateway 132. The remote gateway 132 may then send a copy of the data to its local endpoints 105-107. Aggregating traffic may reduce traffic in a network as compared with the use of a single centralized media gateway, and the use of multiple gateways may allow sharing of distributed media processing resources. Sharing resources may enable the same conference to use DSPs across multiple gateways. Additionally, media processing resources may be selected for use based on proximity to the endpoints of interest. By using local resources, there may be less delay and jitter as well as an increase in bandwidth for a conference.

There may be various functions implemented by a media gateway in a distributed media gateway architecture, such as the architecture 100. First, referring to FIG. 1 as an illustrative example, the media processing resources may be shared among media gateways 131-133, wherein the media gateways 131-133 and the call manager 140 may work together to facilitate coordination of media processing resources. In order to share resources, the call manager 140 may support registration of a plurality of media gateways 131-133. When a gateway, e.g., 131, is initially booted, registration messages may be sent to the call manager 140 so that the call manager 140 may record the status of the DSP resource for that particular gateway 131. The registration messages may be based on existing protocols such as Session Initiation Protocol (SIP) and may comprise information about the capacity and usage of the media processing resource for media gateway 131. The call manager 140 may send messages to the other registered gateways 132 and 133 regarding the availability of the media processing resource of the gateway 131 that has recently joined. The call manager 140 may then send messages to the recently added gateway 131 regarding the availability of media processing resources of the other registered gateways 132 and 133. Essentially, each newly registered gateway may have knowledge of the media processing resources of the other registered gateways 131-133. The gateway 131 may know how to address the call manager 140 when it boots up, which may be part of the configuration.

In order to have enough media processing resources accessible to support the total number of users in a conference, profiles may be created to specify the availability and capacity of resources. There may be two types of profile configurations: static and dynamic. In a static media processing profile configuration, resources may be allocated statically depending on availability and current status. In this configuration type, a user may create a profile on a gateway, such as gateways 131-133, and statically specify the amount of local and remote media processing resources allocated based on the expected size of the conference. The gateway (131-133) may send messages to inform the call manager 140 of the resources' status update, while the call manager 140 may send messages to inform the other gateways 131-133 of the resources' status update. The media processing allocation regarding the profile among gateways 131-133 may not be changed in a static configuration. In a dynamic media processing profile configuration, resources may be allocated in spite of the availability of local or remote gateways 131-133. In this configuration type, a user may create a profile on a gateway 131-133 regarding media processing resource allocations during a conference. The gateway, such as gateway 131, may send messages to inform the call manager 140 of the resources' status update, and the call manager 140 may send messages to inform the other gateways 131-133 of the resources' status update. When users begin to join a conference, the media processing resources may be allocated dynamically based on the expected size of the conference. The dynamic configuration may enable a user to make a decision on which gateway's DSPs to use during a conference as opposed to the static configuration, wherein changes may not be made during a conference even if gateways 131-133 are congested.

Once a media processing profile has been configured, local resources for allocation may be found and employed in collaboration with the endpoints 101-110. Resources may be selected according to distance between an endpoint 101-110 and a gateway 131-133, which may be measured in terms of number of hops. The gateways 131-133 may be grouped together at specific branches to allow sharing of media processing resources. When an endpoint 101-110 is registered to a call manager 140, the call manager 140 may send a message to each of the plurality of gateways 131-133 requesting the gateways 131-133 to "ping" one or more endpoints 101-110 or use "traceroute" to one or more endpoints 101-110. After receiving the "ping" message, each of the gateways 131-133 may determine the distance between itself and the endpoint(s) 101-110 of interest. The gateways 131-133 may then each send messages containing the distance information to the call manager 140. By using suitable options with "ping" and "traceroute," the number of hops that a packet traverses from source to destination can be obtained. In implementation, this information can be obtained by creating an application programming interface or getting from existing network services.

From this information, the call manager 140 may sort the gateways 131-133 in terms of distance from the endpoints 101-110 and resource availability. Resource availability may be measured by metrics such as the number of sessions, the number of users, or the number of voice or video transcodings that a gateway can support, or a number of DSP instructions per unit time (e.g., number of millions of instructions per second (MIPS)) available at the gateway. These metrics may help quantify media processing capability as well as availability. Once the list of gateways 131-133 has been sorted by the call manager 140, the first gateway in the sorted list may be the "local" resource for the registered endpoint of interest. If one of the endpoints 101-110 is a mobile device, it may be re-registered upon moving to a new location. Thus, the call manager 140 may repeat the aforementioned steps of determining and sorting distances and resource availability in order to update the mobile endpoint's local resource accordingly.

Once the local resource is determined, the endpoint 101-110 may employ a gateway 131-133 by sending a request to the call manager 140. The call manager 140 may find the closest gateway by looking at the sorted gateway list specific to the endpoint. The call manager 140 may then update the status of the resource to show that the resource is being utilized by the endpoint. Messages may be sent to all of the gateways 131-133 in the group regarding this usage update. Subsequently, real-time Transport Protocol (RTP) sessions may be set up between the endpoint and the selected gateway for video conferencing in real-time.

In an embodiment, suppose there are two media gateways (e.g., 131 and 132) communicating in a conference with each other, wherein there may be connected endpoints 101-103 and 105-107 behind each gateway 131 and 132, respectively. When a new endpoint 108-110 from another office or branch joins the conference, a corresponding new gateway 133 may be selected as a local resource based on the number of hops, the availability of resources, or some combination of the two. The call manager 140 may then send messages to ask the gateways 131-132 already involved in the conference to take the following actions. An IP trunk (e.g., a 2-way RTP session) between the newly added gateway 133 and each gateway already in use (131-132) may be created. Additionally, a codec characteristic and a media processor with the codec characteristic (e.g., a codec or encoder/decoder), may be communicatively coupled on each side of the IP trunk connecting each pair of gateways 131/133 and 132/133. The codec characteristic may be any transrating or transcoding parameters, such as input and output video resolution and frame rate, input and output audio bit rate, or input and output coding type. In other words, a media processor may receive an input media stream and produce an output media stream by transrating or transcoding the input media stream to produce an output media stream. "Transrating" is understood by a person of ordinary skill in the art to refer to the conversion of one type of encoding to another, and "transrating" is understood by a person of ordinary skill in the art to refer to the conversion of one bit rate to another without necessarily changing the encoding format. There may be media streams produced by each of the endpoints 108-110 and processed and transmitted by the media gateway 133. Likewise, there may be media streams intended for each of the endpoints 108-110 and received by media gateway 133 from another media gateway. A media processor at gateway 133 may be configured to communicate with gateway 131 (via a transmitter) and the same media processor or another media processor may be configured to communicate with gateway 132 (via a transmitter). The media processor may be specified by users based on predefined rules or determined by Medianet features if bandwidth is available.

During a video conference, there may be a significant amount of media traffic between endpoints 101-110 and gateways 131-133. Traffic from local endpoints may be aggregated at a local gateway. Referring to FIG. 1 as an example, there may be a plurality of endpoints 101-110 connected to multiple media gateways 131-133 in a network, and one of the endpoints, such as endpoint 101, may need to send a packet to other endpoints 105-110 at remote sites during a conference. The packet may first be sent to the local gateway 131. At the local site, the packet may be decoded and encoded by a media processor used at the IP trunk between the local gateway 131 and the other remote gateways 132-133. The packet may then be sent to each remote gateway 132-133 through the IP trunk. Each remote gateway 132-133 may then conduct replication and distribution of the packet to its local endpoints, wherein a copy of the packet may be forwarded to each endpoint of interest after decoding/encoding as required. As a result, a copy of the packet may be sent to each involved gateway rather than forwarding the copies to each involved endpoint over the IP network in order to reduce the amount of traffic.

Figure 2:
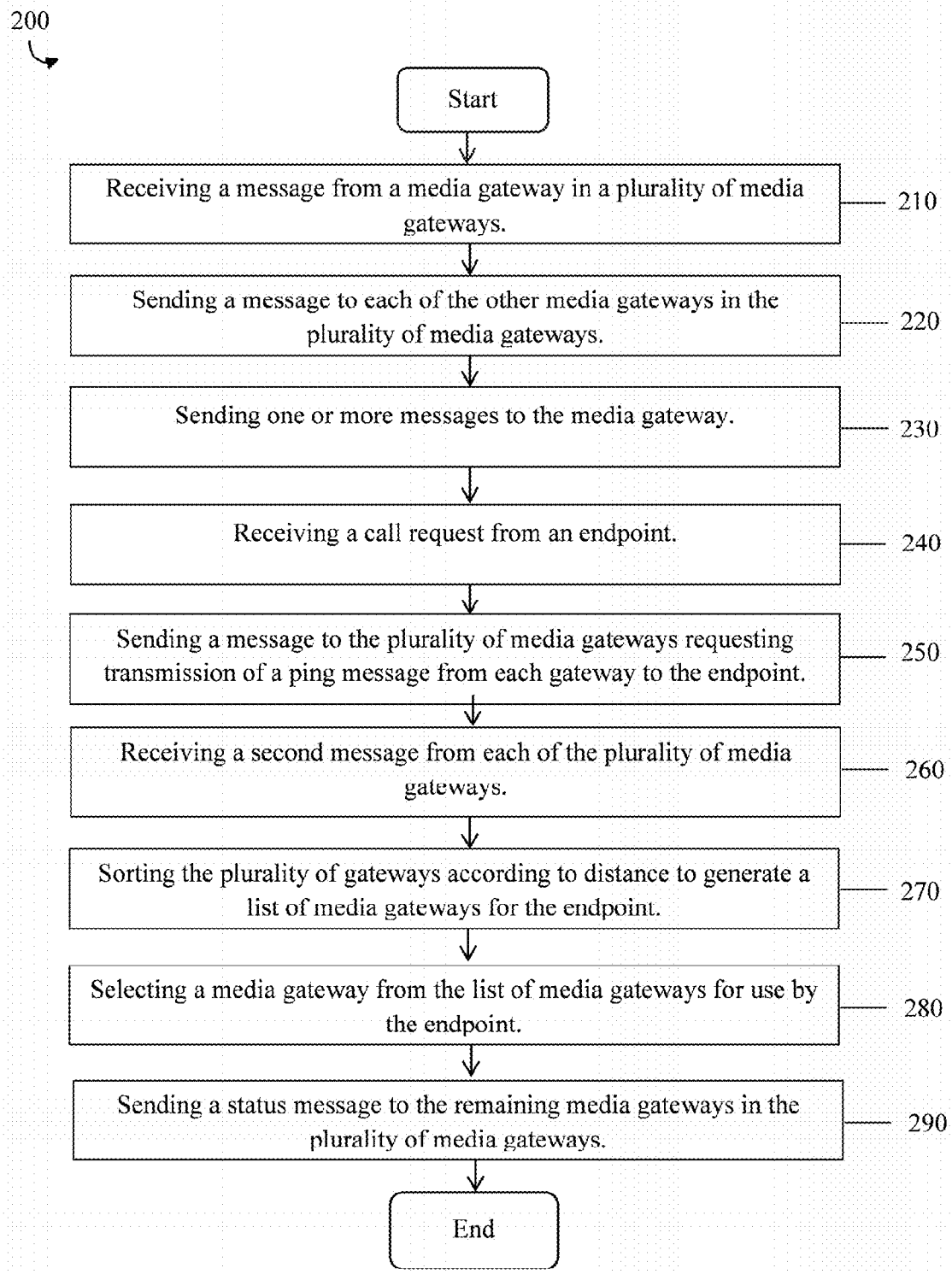
FIG. 2 is a flowchart of an embodiment of a local resource registration and usage method.

FIG. 2 is a flowchart of an embodiment of a local resource registration and usage method. The steps of the flowchart 200 may be implemented in a call manager, such as call manager 140, within a distributed media gateway architecture, such as architecture 100. The flowchart begins in block 210 in which a call manager may receive a message from a media gateway in a plurality of media gateways. The message may be a registration message corresponding to a newly added or initially booted gateway, wherein the registration message indicates the media processing resources available at the media gateway and the amount of media processing resources in use. The message may also be a status update message sent by a gateway to inform the call manager of an update in allocated resources, such as in a dynamic DSP profile configuration. At block 220, the call manager may send a message to each of the other media gateways in the plurality of media gateways. Each of the messages sent may indicate an amount of available media processing resources in the media gateway and may be sent in order to inform the plurality of gateways of the newly added gateway or to notify a status update. In block 230, the call manager may send a message to the media gateway, wherein the message may indicate an amount of available media processing resources in each of the other media gateways in the plurality of media gateways. The message in block 230 may sometimes be referred to as a "resource message."

Next, the call manager may receive a call request from an endpoint in block 240. In block 250, the call manager may then send a message to the plurality of media gateways, wherein the message comprises a request to transmit a ping message from each corresponding media gateway to the endpoint. At block 260, the call manager may receive a second message from each of the plurality of media gateways. The message may comprise distances between the corresponding media gateway and the endpoint, wherein the distances may be measured as the number of hops. In block 270, the call manager may then sort the plurality of gateways according to the distance between the corresponding media gateway and the endpoint in order to generate a list of media gateways for the endpoint. The call manager may next select a media gateway from the list of media gateways for use by the endpoint in block 280, based on the distance from the selected media gateway to the endpoint. In block 290, the call manager may send a status message to the remaining media gateways in the plurality of media gateways, indicating that the selected media gateway is associated with the endpoint. Block 240 may alternatively be performed after block 290, in which case the decision as to which media gateway should be used locally by the endpoint is made prior to receiving the call request.

Figure 3:
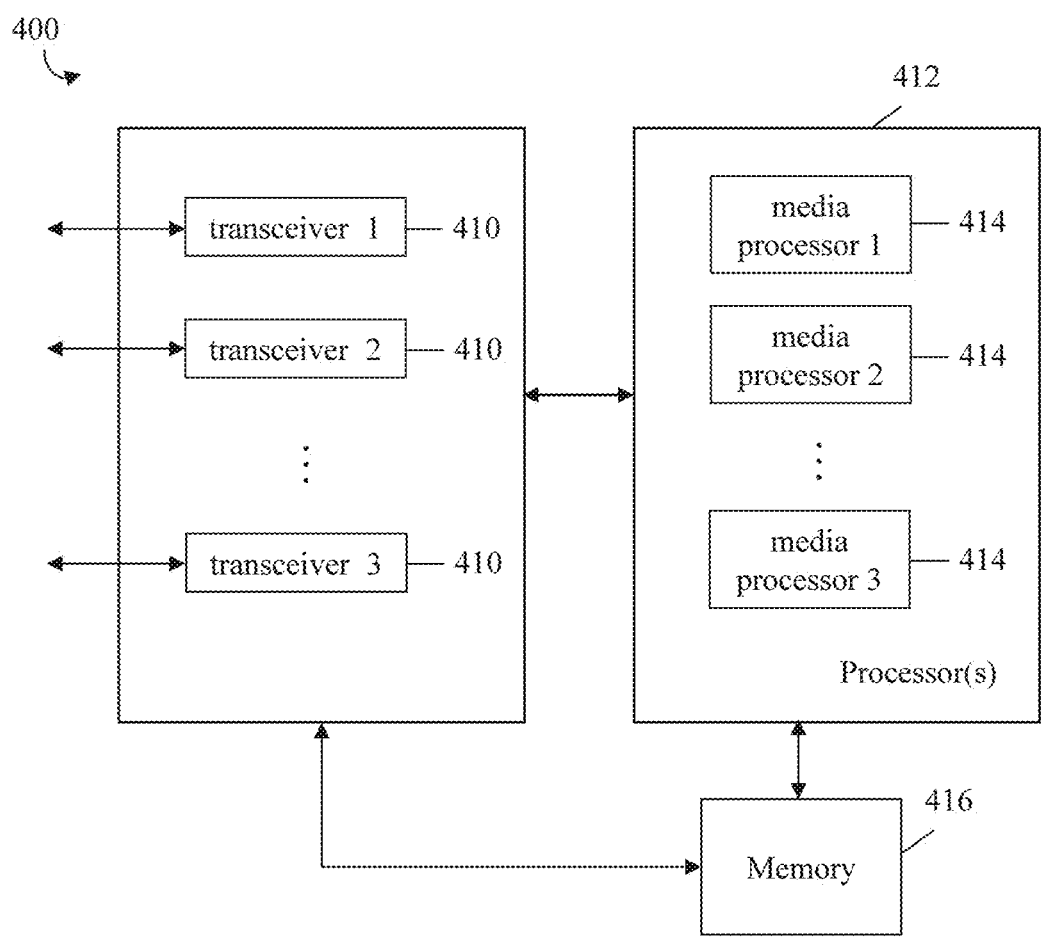
FIG. 3 is an embodiment of a media gateway.

FIG. 3 is an embodiment of a media gateway 400. The media gateway 400 may comprise a plurality of transceivers 410 coupled to at least one processor 412 comprising a plurality of media processors 414 (e.g., there may be m transceivers and n processors where m and n are integers greater than one). The media gateway 400 may be suitable for implementing the methods disclosed herein, including the functionality described with respect to media gateways 131-133. Each of the transceivers may be coupled to another media gateway or another endpoint. The coupling between a transceiver 410 and an endpoint or media gateway may be direct or indirect, i.e., the coupling may be via an intervening network (e.g., an IP network). A transceiver 410 may transmit a media stream to and receive a media stream from an endpoint. Multiple media streams from various endpoints may be collected or aggregated in the media gateway 400 and transmitted to another media gateway via a transceiver 410. The reverse is true, i.e., a media stream or collection of media streams from another gateway may be received by a transceiver 410 and at least a portion of the media stream (after transcoding or transrating by the media processors 414) may be transmitted to endpoints. The at least one processor 412 may separate the collected streams for each endpoint and perform network protocol functions. A plurality of media processors 414 may be employed to encode and decode source video or audio (e.g., transcoding, transrating), along with performing size compression. The at least one processor 414 may be in communication with memory 416, which may store or buffer portions of audio or video streams temporarily. After processing, the resulting streams may be provided to the various endpoints via their respective transceivers 410. In an embodiment, the media streams from each endpoint may be collected into a single stream or maintained as separate streams for multicasting to other media gateways. The memory 416 may comprise secondary storage, random access memory (RAM), and/or read-only memory (ROM) or any combination thereof. The at least one processor 412 may be implemented as one or more central processor unit (CPU) chips, cores (e.g., a multi-core processor), field-programmable gate arrays (FPGAs), application specific integrated circuits (ASICs), and/or DSPs.

Figure 4:
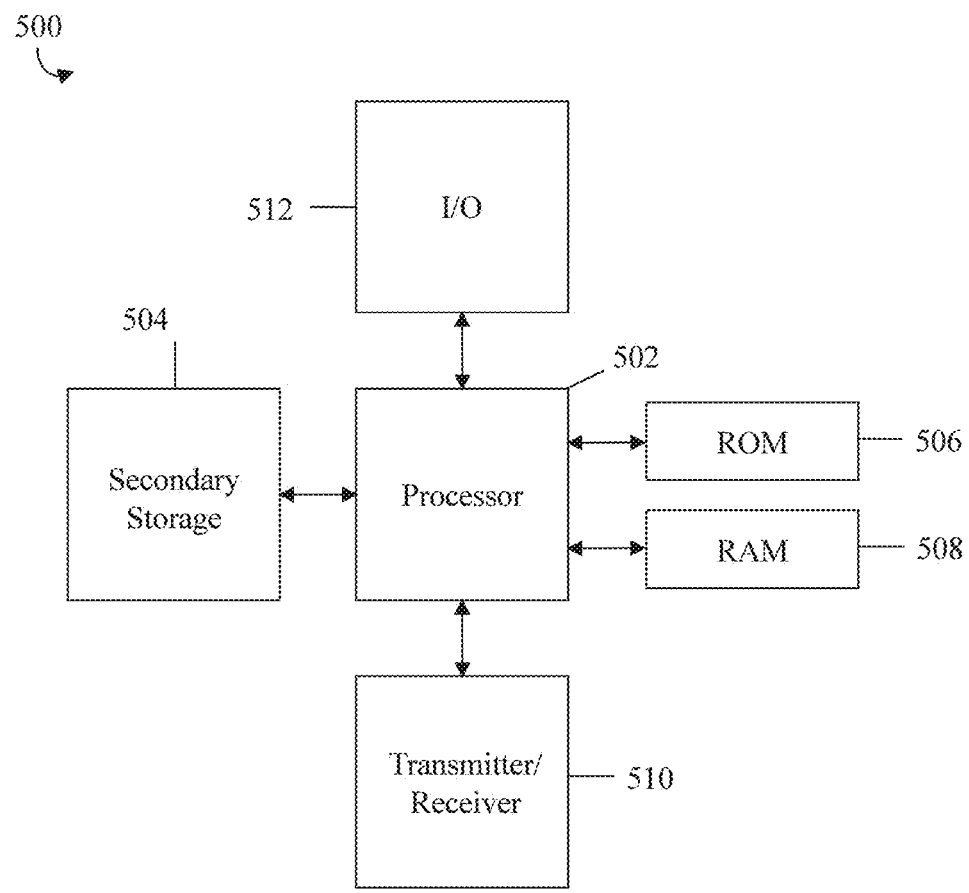
FIG. 4 is a schematic diagram of an embodiment of a call manager.

FIG. 4 is a schematic diagram of an embodiment of a call manager 500 suitable for implementing one or more embodiments of the systems and methods disclosed herein, such as the method 200. The call manager 500 may comprise a processor 502 that is in communication with memory devices including secondary storage 504, ROM 506, RAM 508, input/output (I/O) devices 510, and transmitter/receiver 512. Although illustrated as a single processor, the processor 502 is not so limited and may comprise multiple processors. The processor 502 may be implemented as one or more CPU chips, cores (e.g., a multi-core processor), FPGAs, ASICs, and/or DSPs. The processor 502 may be configured to implement any of the schemes described herein, including the method 200. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 (also referred to as a transceiver) may serve as an output and/or input device of the call manager 500. For example, if the transmitter/receiver 512 is acting as a transmitter, it may transmit data out of the call manager 500. If the transmitter/receiver 512 is acting as a receiver, it may receive data into the call manager 500. Further, the transmitter/receiver 512 may include one or more optical transmitters, one or more optical receivers, one or more electrical transmitters, and/or one or more electrical receivers. The transmitter/receiver 512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 512 may enable the processor 502 to communicate with a media gateway directly or via an Internet or one or more intranets. The I/O devices 510 may be optional or may be detachable from the rest of the call manager 500. The I/O devices 510 may include a video monitor, liquid crystal display (LCD), touch screen display, or other type of display. The I/O devices 510 may also include one or more keyboards, mice, or track balls, or other well-known input devices.

It is understood that by programming and/or loading executable instructions onto the media gateway 400 and/or the call manager 500 at least one of the processor 412, the processor 502, the memory 416, the secondary storage 504, the RAM 508, and the ROM 506 are changed, transforming the media gateway 400 and/or the call manager 500 in part into a particular machine or apparatus having the functionality taught by the present disclosure. For the media gateway, the executable instructions may be stored on the memory 416 and loaded into the processor 412 for execution. For the call manager 500, the executable instructions may be stored on the secondary storage 504, the ROM 506, and/or the RAM 508 and loaded into the processor 502 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   receiving a registration message from a media gateway in a plurality of media gateways, wherein the registration message indicates a media processing resources available at the media gateway and an amount of media processing resources in use;
   sending a message to each of the other media gateways in the plurality of media gateways, wherein each of the messages indicates an amount of available media processing resources in the media gateway; and
   sending a resource message to the media gateway, wherein the resource message indicates the amount of available media processing resources in each of the other media gateways in the plurality of media gateways.

2. The method of claim 1, further comprising:
   receiving an update message from the media gateway, wherein the update message is based on a profile of an endpoint, wherein the profile is created in anticipation of a video conference, and wherein the profile changes the amount of available media processing resources in the media gateway; and
   sending a second message to each of the other media gateways in the plurality of media gateways, wherein each of the second messages indicates the changed amount of available media processing resources in the media gateway.

3. The method of claim 2, further comprising:
   receiving a second update message from the media gateway, wherein the second update message is based on a second endpoint joining the video conference during the video conference, wherein the second update message indicates a second change in the amount of available media processing resources in the media gateway; and
   sending a third message to each of the other media gateways in the plurality of media gateways, wherein each of the third messages indicates the second change in the amount of available media processing resources in the media gateway.

4. The method of claim 1, further comprising:
   sending a second message to each of the plurality of media gateways, wherein the second message comprises a request to transmit a ping message from a corresponding media gateway to an endpoint;
   receiving a third message from each of the plurality of media gateways, wherein each of the third messages comprises a distance between the corresponding media gateway and the endpoint, wherein the distance between two nodes is measured as a number of hops between the two nodes; and
   sorting the plurality of gateways according to the distance between the corresponding media gateway and the endpoint to generate a list of potential media gateways for the endpoint.

5. The method of claim 1, wherein the amount of media processing resources is measured in units of number of voice or video transcodings or number of digital signal processing (DSP) instructions per unit of time.

6. A method performed in a call manager, the method comprising:
   sending a message to a plurality of media gateways, wherein the message comprises a request to transmit a ping message from a corresponding media gateway to an endpoint;
   receiving a second message from each of the plurality of media gateways, wherein each of the second messages comprises a distance between the corresponding media gateway and the endpoint, and wherein the distance between two nodes is measured as a number of hops between the two nodes; and
   sorting the plurality of gateways according to the distance between the corresponding media gateway and the endpoint to generate a list of media gateways for the endpoint.

7. The method of claim 6, further comprising:
   receiving a call request from the endpoint;
   selecting a media gateway from the list of media gateways for use by the endpoint, wherein the selected media gateway is chosen based on the distance from the selected media gateway to the endpoint; and
   sending a status message to each of the other media gateways in the plurality of media gateways, wherein the status message indicates that the selected media gateway is associated with the endpoint.

8. The method of claim 7, wherein the selected gateway is further based on an availability of media processing resources of the selected media gateway.

9. The method of claim 8, wherein an amount of available media processing resources is measured in units of number of voice or video transcodings the selected media gateway can support or number of digital signal processing (DSP) instructions per unit time.

10. The method of claim 7, further comprising transmitting at least one message to the selected media gateway, wherein the at least one message requests that the selected media gateway establish a communications link with a second media gateway, wherein the second media gateway is responsible for a second endpoint and a third endpoint, and wherein the request indicates a codec characteristic for use on the communications link.

11. The method of claim 10, wherein the codec characteristic comprises a video resolution and frame rate.

12. A media gateway comprising:
   a media processor;
   a transceiver coupled to the media processor and configured to:
      receive at least one message from a call manager, wherein the at least one message requests that the media gateway establish a communications link with a second media gateway, wherein the second media gateway is responsible for an endpoint, wherein the request indicates a codec characteristic for use on the communications link;
      establish the communications link;
      receive a plurality of first data packets from the second media gateway via the communications link; and
      provide the first data packets to the media processor,
   wherein the media processor is configured to decode the first data packets according to the codec characteristic to generate decoded packets.

13. The media gateway of claim 12, wherein the media processor is further configured to:
   encode the decoded packets for a second endpoint to generate a first plurality of packets; and encode the decoded packets for a third endpoint to generate a second plurality of packets.

14. The media gateway of claim 13, further comprising a second transceiver configured to:
    transmit the first plurality of packets to a second endpoint; and
    transmit the second plurality of packets to a third endpoint.

15. The media gateway of claim 14, wherein the second transceiver is further configured to receive a plurality of second data packets from the second endpoint and receive a plurality of third data packets from the third endpoint, wherein the media processor is further configured to transcode the second data packets and the third data packets according to the codec characteristic to generate a combined stream of transcoded packets, and wherein the transceiver is further configured to transmit the combined stream of transcoded packets to the second media gateway.

16. The media gateway of claim 12, wherein the communications link is an Internet Protocol (IP) trunk with a two-way real-time transport (RTP) session.

17. The media gateway of claim 12, wherein the codec characteristic comprises a video resolution and frame rate.

18. The media gateway of claim 12, wherein the codec characteristic is determined based on available media processing resources at each of the media gateway and the second media gateway.

19. The media gateway of claim 12,
    wherein the media processor is further configured to:
        transcode the first data packets according to the codec characteristic and requirements of a second endpoint to generate a first plurality of transcoded packets; and
        transcode the first data packets according to the codec characteristic and requirements of a third endpoint to generate a second plurality of transcoded packets.

20. The media gateway of claim 19, further comprising:
    a second transceiver configured to transmit the first plurality of transcoded packets to the second endpoint; and
    a third transceiver configured to transmit the second plurality of transcoded packets to the third endpoint.

21. An apparatus comprising:
    a transceiver configured to:
        receive a registration message from a media gateway in a plurality of media gateways, wherein the registration message indicates a media processing resources available at the media gateway and an amount of media processing resources in use;
        send a message to each of the other media gateways in the plurality of media gateways, wherein each of the messages indicates an amount of available media processing resources in the media gateway; and
        send a resource message to the media gateway, wherein the resource message indicates the amount of available media processing resources in each of the other media gateways in the plurality of media gateways.

22. The apparatus of claim 21, wherein the transceiver is further configured to:
    receive an update message from the media gateway, wherein the update message is based on a profile of an endpoint, wherein the profile is created in anticipation of a video conference, and wherein the profile changes the amount of available media processing resources in the media gateway; and
    send a second message to each of the other media gateways in the plurality of media gateways, wherein each of the second messages indicates the changed amount of available media processing resources in the media gateway.

23. The apparatus of claim 21, wherein the transceiver is further configured to:
    send a second message to each of the plurality of media gateways, wherein the second message comprises a request to transmit a ping message from a corresponding media gateway to an endpoint; and
    receive a third message from each of the plurality of media gateways,
    wherein each of the third messages comprises a distance between the corresponding media gateway and the endpoint,
    wherein the distance between two nodes is measured as a number of hops between the two nodes, and
    wherein the apparatus further comprises a processor configured to sort the plurality of gateways according to the distance between the corresponding media gateway and the endpoint to generate a list of potential media gateways for the endpoint.

\* \* \* \* \*